(12) United States Patent
Flacht et al.

(10) Patent No.: US 10,167,921 B2
(45) Date of Patent: Jan. 1, 2019

(54) HYDRAULIC DAMPER WITH A HYDRO-MECHANICAL COMPRESSION STOP ASSEMBLY

(71) Applicant: BeijingWest Industries Co., Ltd., Beijing (CN)

(72) Inventors: Piotr Andrzej Flacht, Crakow (PL); Radoslaw Pawel Grzesik, Crakow (PL); Jakub Wrzesinski, Crakow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/490,840

(22) Filed: Apr. 18, 2017

(65) Prior Publication Data

US 2017/0328439 A1   Nov. 16, 2017

Related U.S. Application Data

(60) Provisional application No. 62/335,907, filed on May 13, 2016.

(51) Int. Cl.
  *F16F 9/49* (2006.01)
  *F16F 9/32* (2006.01)
  *F16F 9/58* (2006.01)

(52) U.S. Cl.
  CPC .............. *F16F 9/49* (2013.01); *F16F 9/3214* (2013.01); *F16F 9/3242* (2013.01); *F16F 9/585* (2013.01)

(58) Field of Classification Search
  CPC ........... F16F 9/49; F16F 9/3214; F16F 9/3242
  (Continued)

(56) References Cited

U.S. PATENT DOCUMENTS

| 2,148,839 A | 2/1939 | Rossman et al. |
| 2,379,750 A | 7/1945 | Rossman |

(Continued)

FOREIGN PATENT DOCUMENTS

| CN | 104204601 A | 12/2014 |
| CN | 104919207 A | 9/2015 |

(Continued)

OTHER PUBLICATIONS

Extended European Search Report dated Dec. 5, 2017 (8 Pages).

(Continued)

*Primary Examiner* — Thomas J Williams
*Assistant Examiner* — Mariano Sy
(74) *Attorney, Agent, or Firm* — William H. Honaker; Dickinson Wright PLLC

(57) ABSTRACT

A hydraulic damper including a tube. A piston assembly is disposed slidably inside the tube and divides the tube into a rebound chamber and a compression chamber. A fluid compensation chamber is located outside of the tube. A base valve assembly controls the flow of the fluid between the compression and compensation chambers. A hydro-mechanical compression stop assembly includes a covering member that overlies the base valve assembly and defines a main flow channel and an auxiliary flow channel that each fluidly connect the compression chamber and the base valve assembly. A closing member selectively closes the main flow channel. A first telescoping sleeve is coupled with the piston assembly and a second telescoping sleeve has a base connected to the closing member. A first spring is compressed between the piston assembly and the base to bias the closing member in an extended position.

8 Claims, 5 Drawing Sheets

(58) Field of Classification Search
USPC .............. 188/280, 284, 313, 322.14, 322.15, 188/322.22
See application file for complete search history.

(56) References Cited

U.S. PATENT DOCUMENTS

| | | | |
|---|---|---|---|
| 2,395,027 A | 2/1946 | Whisler, Jr. | |
| 2,527,034 A | 10/1950 | Rossman | |
| 2,599,477 A * | 6/1952 | Patriquin | F16F 9/48 137/493.8 |
| 2,619,199 A * | 11/1952 | Schwary | F16F 9/49 188/284 |
| 2,695,778 A | 11/1954 | Mercier et al. | |
| 2,717,058 A * | 9/1955 | Brundrett | F16F 9/348 188/320 |
| 2,729,308 A | 1/1956 | Koski et al. | |
| 2,742,112 A | 4/1956 | Wessel | |
| 3,036,669 A | 5/1962 | Schultze | |
| 4,113,072 A * | 9/1978 | Palmer | F16F 9/348 188/282.6 |
| 4,768,629 A | 9/1988 | Wossner | |
| 5,219,414 A * | 6/1993 | Yamaoka | F16F 9/48 188/284 |
| 8,066,105 B2 * | 11/2011 | Maniowski | F16F 9/512 188/282.1 |
| 8,807,299 B2 * | 8/2014 | Gagnon | F16F 9/48 188/284 |
| 8,919,505 B2 * | 12/2014 | Slusarczyk | F16F 9/512 188/282.5 |
| 2016/0195153 A1 * | 7/2016 | Teraoka | F16F 9/49 188/284 |

FOREIGN PATENT DOCUMENTS

| | | |
|---|---|---|
| DE | 1069956 | 5/1960 |
| DE | 3602224 | 7/1987 |
| ES | 2152798 A1 | 2/2001 |
| ES | 2152798 B1 | 2/2001 |

OTHER PUBLICATIONS

First Office Action and Search Report dated Jun. 4, 2018, for counterpart Chinese Patent Application No. 201710281850.7, Seven Pages.

* cited by examiner

HYDRAULIC DAMPER WITH A HYDRO-MECHANICAL COMPRESSION STOP ASSEMBLY

CROSS REFERENCE TO RELATED APPLICATION

This application claims the benefit of U.S. Provisional Patent Application Ser. No. 62/335,907 filed on May 13, 2016, and titled "Hydraulic Damper with a Hydro-Mechanical Compression Stop Assembly", the entire disclosure of which is hereby incorporated by reference.

TECHNICAL FIELD

The subject invention relates to a hydraulic damper for a vehicle. More particularly, the subject invention relates to a hydraulic damper having a hydro-mechanical compression stop assembly.

BACKGROUND OF THE INVENTION

It is known in the art for hydraulic dampers for vehicles to include a hydro-mechanical compression stop assembly to provide for the generation of an additional damping force. Exemplary dampers provided with such a hydro-mechanical compression stop assembly are disclosed in U.S. Pat. Nos. 2,619,199 and 2,729,308. Such hydro-mechanical stop assemblies include a closing shield that is biased in an extended position by a spring, and configured to close a main flow channel of a base valve assembly depending on an axial position of a piston rod. The damping force provided by the hydro-mechanical stop assembly depends primarily on the position of the piston rod, and provides a very progressive increase in damping force as the rod progresses through a compression stroke.

The axial position of the spring on such a hydro-mechanical compression stop assembly is critical for the operation thereof. More particularly, if the spring buckles as a result of repeated stop engagements or otherwise deviates from its axial position, the closing shield attached to the spring may not entirely close this channel, thus yielding unpredictable results.

Accordingly, there remains a need for improvements to hydraulic dampers having a hydro-mechanical compression stop assembly.

As such it is an object of the present invention to provide a hydraulic damper with a hydro-mechanical compression stop assembly that provides a high and progressive increase of damping force in dependence on rod displacement, features improved axial stability, is of simple construction, is cost efficient and simple to manufacture.

It is another object of the present invention to provide a hydraulic damper with a hydro-mechanical compression stop assembly that maximizes available compression stroke length.

SUMMARY OF THE INVENTION

According to an aspect of the disclosure, a hydraulic damper is provided for a vehicle. The hydraulic damper includes a tube that extends along an axis and is filled with a working liquid. A piston assembly is disposed slidably inside the tube for generating a damping force. The piston assembly divides the tube into a rebound chamber and a compression chamber. A piston rod is connected to the piston assembly and extends outside the tube. A fluid compensation chamber is located outside of the tube. A base valve assembly is located at an end of the compression chamber for controlling the flow of the working fluid between the compression chamber and the compensation chamber. A hydro-mechanical compression stop assembly is provided for generating an additional damping force at the end of a compression stroke of the piston assembly. The hydro-mechanical compression stop assembly includes a covering member that overlies the base valve assembly in the compression chamber and defines at least one main flow channel that fluidly connects the compression chamber and the base valve assembly. The covering member further defines at least one auxiliary flow channel that is spaced from the main flow channel and also fluidly connects the compression chamber and the base valve assembly. A closing member overlies the main flow channel for selectively closing the main flow channel based on the axial position of the piston rod. A telescopic arrangement is attached to the piston assembly and includes a pair of sleeves in telescoping relationship with one another. One of the sleeves is an engaging sleeve that has a base coupled with the closing member. A first spring is compressed between the piston assembly and the base to bias the closing member in an extended position.

The working characteristics of the subject hydro-mechanical compression stop assembly are easily tunable and its telescopic properties provide for minimizing its length in a fully compressed (engaged) position in which the closing member closes the main flow channel, thereby maximizing available compression stroke length. The telescopic arrangement also stabilizes axial displacement of the sleeves while the compression stop assembly engages the base valve, regardless of the condition (e.g., buckling) of the spring.

According to another aspect of the disclosure, the base of the engaging sleeve defines at least one channel, the closing member includes a closing shield that is moveably connected to the base of the engaging sleeve and overlies the at least one main flow channel, and a second spring that extends between and is connected to the closing shield and the base and biases the closing shield in an extended position. Such an arrangement of the closing shield provides for the immediate return flow of working liquid during stroke reversal of the piston assembly.

According to another aspect of the disclosure, at least one of the sleeves of the telescopic arrangement includes an annular ring and a plurality of axial bridges that extend axially from the annular ring and terminate at a radial lip that engages one of the piston assembly and the other of the sleeves of the telescopic arrangement. Such an openwork construction of the sleeves provides a simple and compact telescopic arrangement, and enables for a convenient snap-on assembly of the telescopic arrangement.

According to another aspect of the disclosure, the covering member is attached to the base valve assembly.

According to another aspect of the disclosure, the covering member defines a center along the axis, and the main flow channel is defined at the center of the covering member.

According to another aspect of the disclosure, the tube defines an internal surface, and the covering member defines the at least one auxiliary flow channel adjacent to the internal surface of the damper tube.

According to another aspect of the disclosure, a cross-sectional flow surface of the auxiliary flow channel is smaller than a cross-sectional flow surface of the main flow channel.

According to another aspect of the disclosure, the piston assembly defines an internal chamber, and an end of the first spring is disposed in the internal chamber of the piston assembly. The internal chamber provides the opportunity to maximize available compression stroke length.

According to another aspect of the disclosure, a shoulder nut secures the piston assembly to the piston rod, the shoulder nut includes a flange that extends radially outwardly, and the telescopic arrangement is slideably attached to the flange of the shoulder nut.

In view of the foregoing, the hydraulic stop arrangement according to the present invention may easily be configured to generate an additional damping force during the compression stroke of the piston assembly, thus enabling a wide range of tuning of the force gains. The performance of the arrangement may depend both on the piston position (mechanical response of the spring) as well as on the piston velocity (hydraulic response generated by the auxiliary flow channels).

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
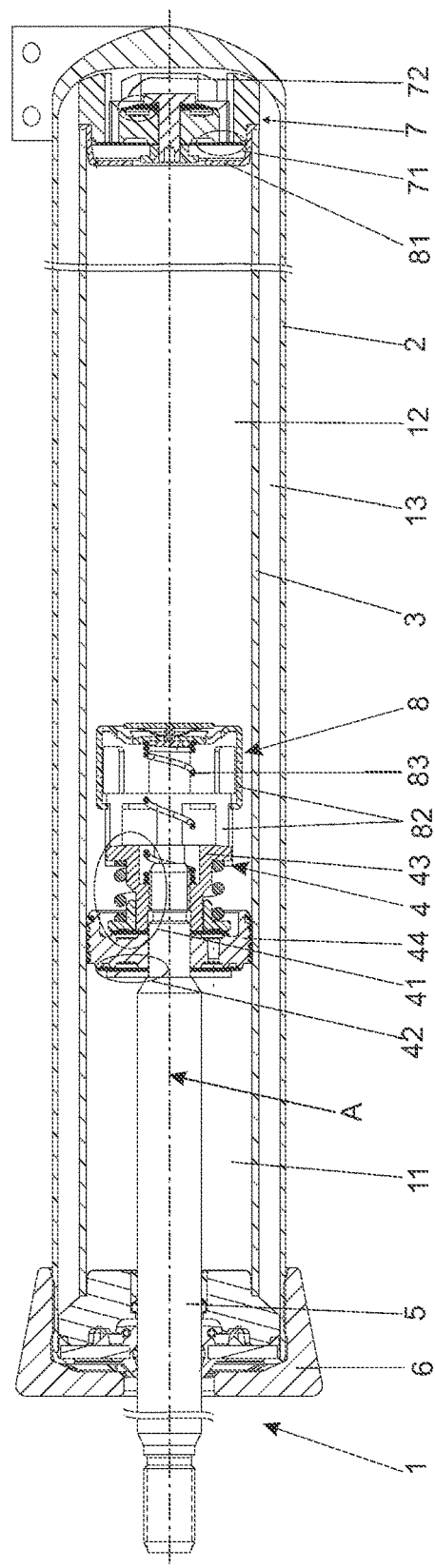
FIG. 1 is a schematic cross-sectional view of a twin-tube damper according to the present invention provided with an embodiment of a hydro-mechanical compression stop.

FIG. 1 presents an embodiment of a twin-tube damper 1 according to the subject invention that may be employed in a typical vehicle suspension, such as on an automobile. The damper 1 comprises an external tube 2 and a main tube 3, each extending along an axis A and filled with viscous working liquid. A movable piston assembly 4 is axially slideable within the main tube 3. A piston rod 5 is attached to the piston assembly 4 and extends outside the damper 1 through a sealed piston rod guide 6 at a first end of the main tube 3. The damper 1 is also provided with a base valve assembly 7 fixed at a second end of the main tube 3 opposite the first end. The piston assembly 4 makes a sliding fit with the inner surface of the main tube 3 and divides the tube 3 into a rebound chamber 11 (between the piston rod guide 6 and the main piston assembly 4) and a compression chamber 12 (between the piston assembly 4 and the base valve assembly 7) and provides a damping force during movement thereof. Part of the compensation chamber 13 is located at the other side of the base valve assembly 7 opposite the compression chamber 12.

As known to those skilled in the art, the piston assembly 4 is provided with compression and rebound valve assemblies 42, 41 to control the flow of working liquid passing between the rebound chamber 11 and the compression chamber 12 while the piston assembly 4 is in motion. The piston assembly 4 comprises a piston body 44 secured on the piston rod 5 by means of a shoulder nut 43 screwed on a threaded end of the rod 5. The base valve assembly 7 is also provided with rebound and compression valve assemblies 71, 72 to control the flow of working liquid passing between the compensation chamber 13 and the compression chamber 12, respectively, during rebound and compression strokes of the piston assembly 4. Valve assemblies 41, 42 and 71, 72 provide design parameters that may be used to shape desired damping characteristics of the damper 1.

A hydro-mechanical compression stop assembly 8 is disposed in the compression chamber 12 for generating an additional damping force at the end of the compression stroke of the piston assembly 4. The assembly 8 comprises a covering member 81 overlying and attached to the base valve assembly 7, a telescopic arrangement 82 attached slidably to the piston assembly 4 and a first spring 83 disposed within the telescopic arrangement 82. Operation of the hydro-mechanical compression stop assembly is demonstrated in FIGS. 2a to 2d and FIGS. 3a and 3b.

Figure 2A:
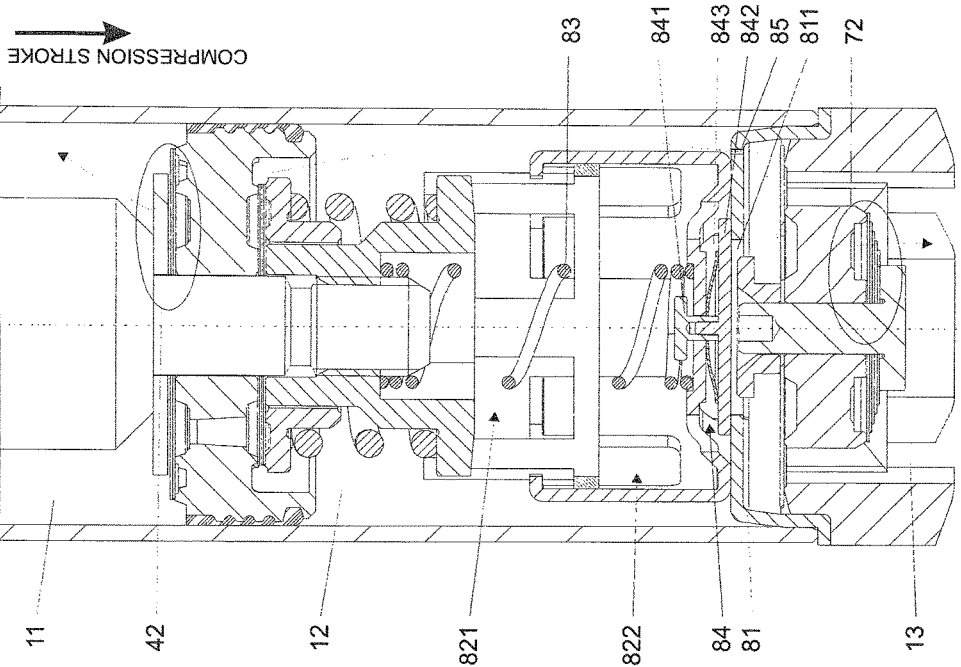
FIG. 2a is a schematic cross-sectional view illustrating the operation of the hydro-mechanical compression stop shown in FIG. 1 in a disengaged position during a damper compression stroke.
Figure 3B:
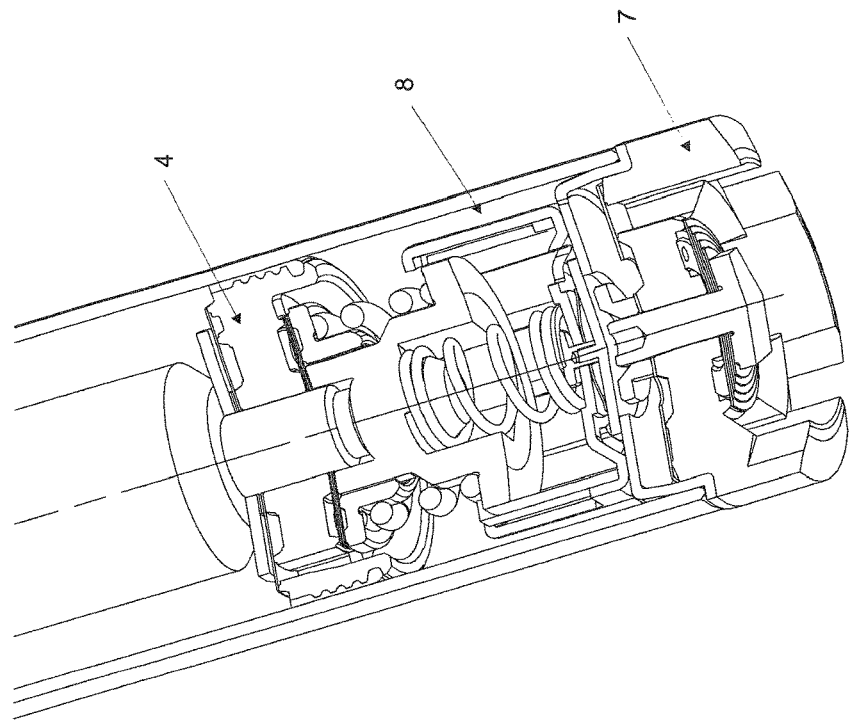
FIG. 3b is a schematic cross-sectional perspective view of the hydro-mechanical compression stop shown in FIG. 1 in a final engaged position during the damper compression stroke.
Figure 3A:
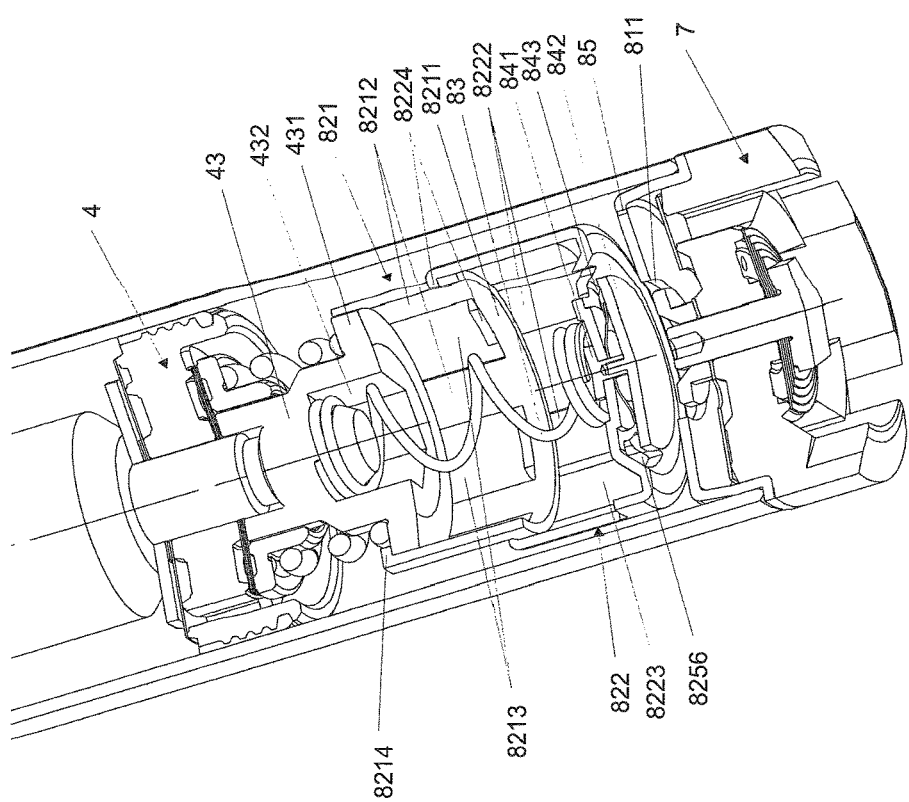
FIG. 3a is a schematic cross-sectional perspective view of the hydro-mechanical compression stop shown in FIG. 1 in a disengaged position.

As shown in FIG. 2a and FIG. 3a, which illustrate a part of the damper of FIG. 1, in this embodiment the telescopic arrangement 82 comprises only two cylindrical sleeves 821 and 822 of an openwork construction.

The first sleeve 821 is provided with an annular ring 8211 from which six axial bridges 8212 extend to the shoulder nut 43. Six axial slots 8213 are defined between the axial bridges 8212. The other ends of the bridges 8212 terminates at radial lips 8214 which radially engage a flange 431 of the shoulder nut 43 of the piston assembly 4. As such, the sleeve 821 may axially move between the flange 431 and the piston body 44. During assembly of the subject damper 1, the lips 8214 are simply radially extended to snap the sleeve 821 over the flange 431 of the shoulder nut 43.

The second, or engaging sleeve 822 has a diameter that is larger than the diameter of the first sleeve 821 and is also provided with an annular ring 8221 from which six axial bridges 8222 extend. The axial bridges 8222 extend to the first sleeve 821 and define six axial slots 8223 therebetween. The other ends of the bridges 8222 terminate at radial lips 8224 which radially engage the annular ring 8211 between the bridges 8212 of the first sleeve 821. As such, the engaging sleeve 822 may move between the annular ring 8211 of the movable first sleeve 821 and the piston body 44. During assembly of the subject damper 1, the lips 8224 may simply be radially extended to snap the sleeve 822 over the annular ring 8211 of the first sleeve 821.

The first spring 83 is compressed between the shoulder nut 43 and a base 8225 of the engaging sleeve 822 to maintain an extended position of the telescopic arrangement 82.

The shaped covering member 81 is fixed between a body 73 of the base valve assembly 7 and the damper tube 3. The covering member 81 defines a main flow channel 811 located at the center thereof along the axis A, and a plurality of auxiliary flow channels 85 spaced from the main flow channel 811. The main and auxiliary flow channels 811, 85 fluidly connect the compression chamber 12 and the base valve assembly 7. In the example embodiment, the auxiliary flow channels 85 are equiangularly disposed over the perimeter of the face of the covering member 81 adjacent to the internal surface of the damper tube 3. A cross-sectional flow surface of each of the auxiliary flow channels 85 is smaller than the cross-sectional flow surface of the main flow channel 811.

As illustrated with a dashed arrow, during the compression stroke of the damper, while the hydro-mechanical compression stop 8 remains in a disengaged position, working liquid flows from the compression chamber 12 to the rebound chamber 11 through the compression valve assembly 42 of the piston assembly 4. Due to the presence of the piston rod 5 in the rebound chamber 11, the increasing volume of the rebound chamber 11 does not compensate the decreasing volume of the compression chamber 12. Therefore working liquid also flows from the compression chamber 12 to the compensation chamber 13. As illustrated with a dashed arrow, it flows around and through the telescopic arrangement 82, including a number of equiangularly spaced channels in the form of radial slots 8256 provided in the base of the engaging sleeve 822, further through the main flow channel 811 of the covering member 81 and subsequently through the compression valve assembly 72 of the base valve assembly 7.

Figure 2B:
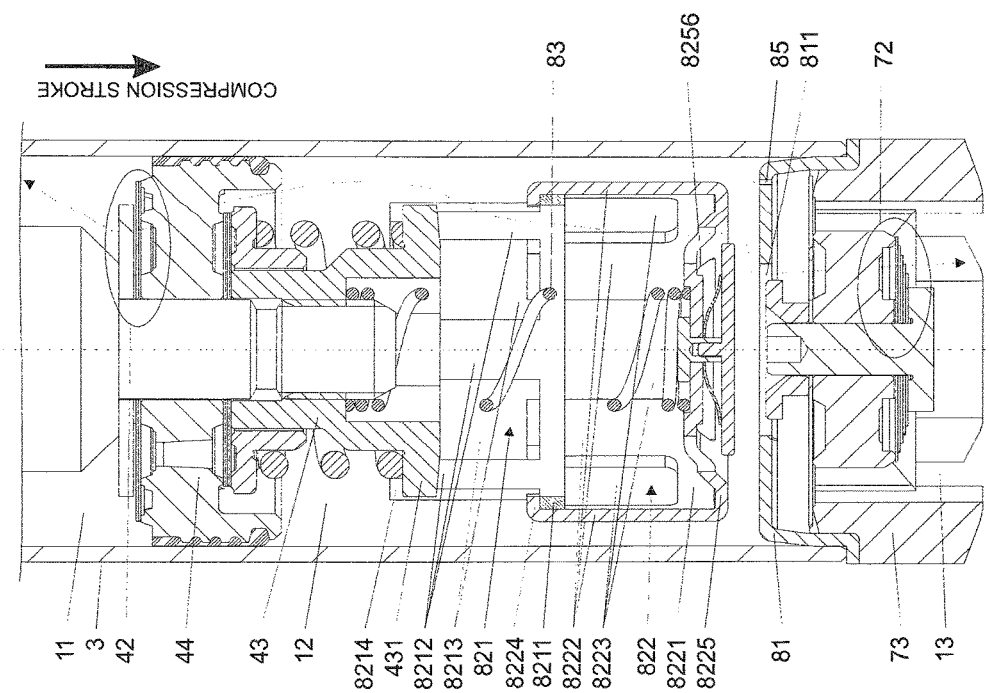
FIG. 2b is a schematic cross-sectional view illustrating the operation of the hydro-mechanical compression stop shown in FIG. 1 in an engaged position during the damper compression stroke.

As shown in FIG. 2b, in this embodiment the hydro-mechanical compression stop 8 also comprises a closing member 84 that is configured to selectively close the main flow channel 811 based on the axial position of the piston rod 5. More particularly, the closing member 84 is disposed slidably within a hole of the base 8225 of the engaging sleeve 822. The closing member 84 comprises a closing shield 842 apt to cover the main flow channel 811 of the covering member 81, a pin 841 screwed on a threaded protrusion of the closing shield 842 and securing the shield 842 from inside the telescopic arrangement 82, and a coned-disc second spring 843 disposed between the closing shield 842 and the base 8225 of the engaging sleeve 822 to maintain an extended position of the closing member 84, as shown in FIG. 2a.

As illustrated with a dashed arrow, during the compression stroke of the damper, while the telescopic arrangement 82 engages the covering member 81, the closing shield 842 covers the main flow channel 811 of the covering member 81, thus allowing working liquid to flow from the compression chamber 12 only through the smaller auxiliary flow channels 85 before it reaches the compensation chamber 13 through the compression valve assembly 72. This flow restriction generates additional damping force due to the working liquid viscous friction. The damping force increases linearly due to the reaction force of the first spring 83, along with the decreasing height of the telescopic arrangement 82.

Figure 2C:
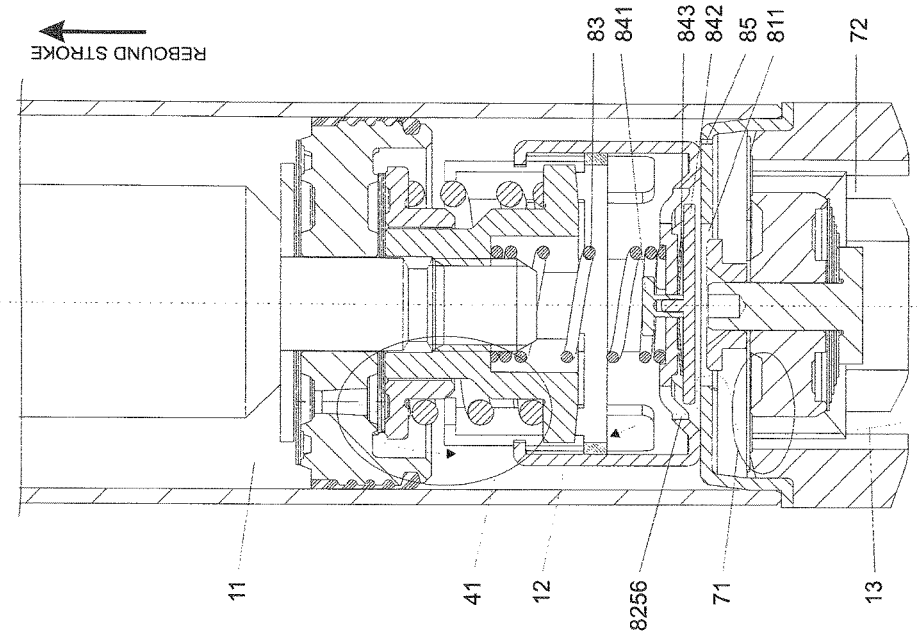
FIG. 2c is a schematic cross-sectional view illustrating the operation of the hydro-mechanical compression stop shown in FIG. 1 in the final engaged position during the damper compression stroke.

FIG. 2c and FIG. 3b illustrate a final engagement position of the hydro-mechanical compression stop 8 where the flow of working liquid is no longer possible. It should be appreciated that this position should not take place in practical applications, as the stop 8 is configured to dissipate all kinetic energy in any intermediate engaging positions, as illustrated in FIG. 2b. Nonetheless, this final engagement position illustrates the capabilities of the stop 8 with regard to the compression stroke limitations. As shown, the piston assembly 4 during the compression stroke is able to reach almost the same position it could reach without the hydro-mechanical compression stop 8. A residual height H that is unavailable for the piston assembly 4 is mainly determined only by the thickness of the base 8225 of the engaging sleeve 822 and, in this embodiment, also by the closing member 84.

Almost entirely compressed, internal first spring 83 is now disposed in an internal chamber 432 provided within the shoulder nut 43. The internal chamber 432 also provides a torque application surface (cf. FIGS. 3a and 3b) for a hex key used to screw the nut 43 over the piston rod 5 in order to fix all the components of the piston assembly 4 together.

Figure 2D:
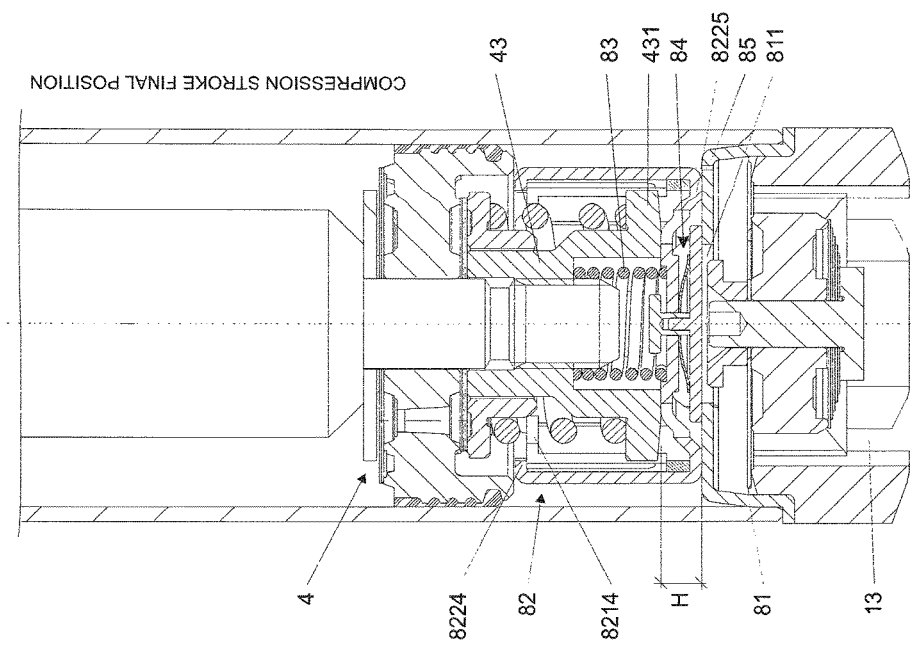
FIG. 2d is a schematic cross-sectional view illustrating the operation of the hydro-mechanical compression stop shown in FIG. 1 in an engaged position during the damper rebound stroke.

As illustrated in FIG. 2d, when the stroke of the damper 1 changes to a rebound stroke, the working liquid pressure in the compensation chamber 13 pushes the closing shield 842 of the closing member 84 against the small pressure of the second spring 843 in the rebound direction, thus opening the main flow channel 811, even though the base 8225 pushed by the first spring 83 still adjoins the covering member 81. Accordingly, working fluid may flow again from the compensation chamber 13 to the compression chamber 12 through the rebound valve assembly 71 of the base valve assembly 7, through the main flow channel 811 and through the radial slots 8256, as well as from the rebound chamber 11 to the compression chamber 12 through the rebound valve assembly 41 of the piston assembly 4.

Figure 4:
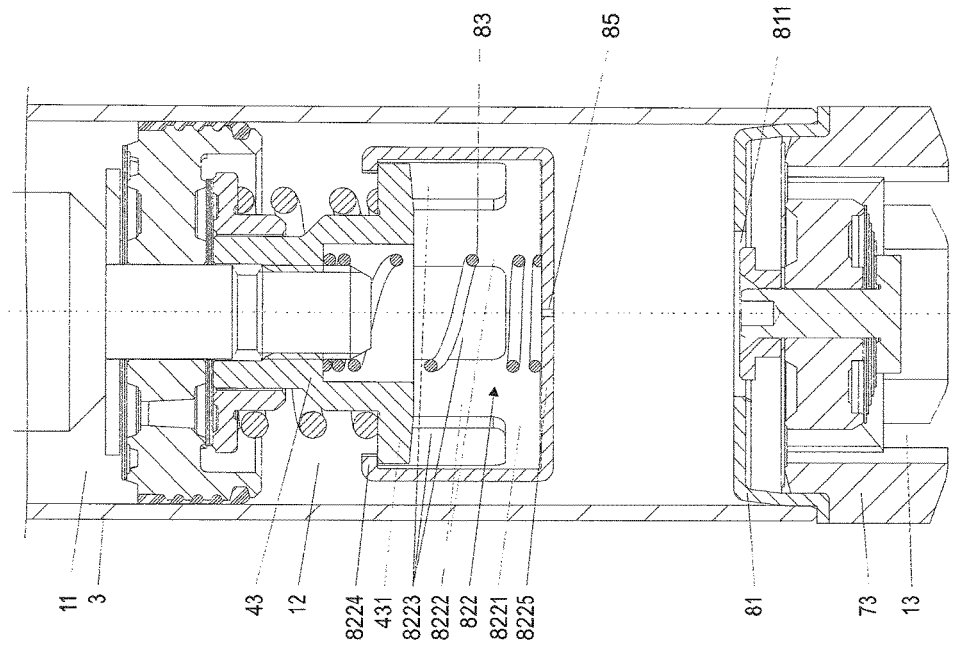
FIG. 4 is a schematic cross-sectional view illustrating another embodiment of a hydro-mechanical compression stop.

FIG. 4 illustrates another embodiment the hydro-mechanical compression stop assembly 8 having a telescopic arrangement containing only one sleeve 822 provided with a central auxiliary flow channel 85 in its base 8225.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:
1. A hydraulic damper for a vehicle comprising:
a tube extending along an axis and filled with a working liquid;
a piston assembly disposed slidably inside said tube for generating a damping force and dividing said tube into a rebound chamber and a compression chamber;
a piston rod connected to said piston assembly and extending outside said tube;
a fluid compensation chamber located outside of said tube;
a base valve assembly located at an end of said compression chamber for controlling the flow of said working fluid between said compression chamber and said compensation chamber;
a hydro-mechanical compression stop assembly for generating an additional damping force at the end of a compression stroke of said piston assembly, said hydro-mechanical compression stop assembly comprising:
a covering member overlying said base valve assembly in said compression chamber and defining at least one main flow channel fluidly connecting said compression chamber and said base valve assembly,
said covering member further defining at least one auxiliary flow channel spaced from said main flow channel and fluidly connecting said compression chamber and said base valve assembly, a closing member overlying said main flow channel for selectively closing said main flow channel based on the axial position of said piston rod, a telescopic arrangement attached to said piston assembly and comprising a pair of sleeves in telescoping relationship with one another, wherein one of said sleeves is an engaging sleeve having a base coupled with said closing member, and a first spring compressed between said piston assembly and said base to bias said closing member in an extended position, wherein said base of said engaging sleeve defines at least one channel; said closing member includes a closing shield moveably connected to said base of said engaging sleeve and overlying said at least one main flow channel, and a second spring that extends between and is connected to said closing shield and said base and biases said closing shield in an extended position.

2. A hydraulic damper as set forth in claim 1 wherein at least one of said sleeves of said telescopic arrangement includes an annular ring; and a plurality of axial bridges extend axially from said annular ring and terminate at a radial lip engaging one of said piston assembly and the other of said sleeves of said telescopic arrangement.

3. A hydraulic damper as set forth in claim 2 wherein said covering member is attached to said base valve assembly.

4. A hydraulic damper as set forth in claim 1 wherein said covering member defines a center along said axis, and wherein said main flow channel is defined at said center of said covering member.

5. A hydraulic damper as set forth in claim 1 wherein said tube defines an internal surface, and wherein said covering member defines said at least one auxiliary flow channel adjacent to said internal surface of the tube.

6. A hydraulic damper as set forth in claim 1 wherein a cross-sectional flow surface of said auxiliary flow channel is smaller than a cross-sectional flow surface of said main flow channel.

7. A hydraulic damper as set forth in claim 1 wherein said piston assembly defines an internal chamber, and wherein an end of said first spring is disposed in said internal chamber of said piston assembly.

8. A hydraulic damper as set forth in claim 1 further including a shoulder nut securing said piston assembly to said piston rod; said shoulder nut including a flange extending radially outwardly; and wherein said telescopic arrangement is slidably attached to said flange of said shoulder nut.

* * * * *